United States Patent
Yoshitomi (10) Patent No.: US 10,176,714 B2
(45) Date of Patent: Jan. 8, 2019

(54) DRIVING SUPPORT APPARATUS

(71) Applicant: DENSO CORPORATION, Kariya, Aichi-pref. (JP)

(72) Inventor: Naoto Yoshitomi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 62 days.

(21) Appl. No.: 15/287,306

(22) Filed: Oct. 6, 2016

(65) Prior Publication Data

US 2017/0103652 A1    Apr. 13, 2017

(30) Foreign Application Priority Data

Oct. 8, 2015   (JP) ................................. 2015-200244

(51) Int. Cl.
| | |
|---|---|
| *G08G 1/0962* | (2006.01) |
| *B60W 30/18* | (2012.01) |
| *B60W 50/14* | (2012.01) |
| *G08G 1/095* | (2006.01) |

(52) U.S. Cl.
CPC ... *G08G 1/09623* (2013.01); *B60W 30/18145* (2013.01); *B60W 30/18154* (2013.01); *B60W 50/14* (2013.01); *G08G 1/095* (2013.01); *B60W 2050/143* (2013.01); *B60W 2050/146* (2013.01); *B60W 2420/40* (2013.01); *B60W 2520/10* (2013.01); *B60W 2540/20* (2013.01); *B60W 2550/22* (2013.01)

(58) Field of Classification Search
None
See application file for complete search history.

(56) References Cited

U.S. PATENT DOCUMENTS

| | | | |
|---|---|---|---|
| 2007/0177014 A1 | 8/2007 | Frenzel et al. | |
| 2014/0118553 A1* | 5/2014 | Diba | ..................... G08G 1/087 348/149 |
| 2015/0213319 A1 | 7/2015 | Frenzel et al. | |
| 2015/0215550 A1 | 7/2015 | Frenzel et al. | |

\* cited by examiner

*Primary Examiner* — Mussa A Shaawat
*Assistant Examiner* — Kyung J Kim
(74) *Attorney, Agent, or Firm* — Knobbe, Martens, Olson & Bear, LLP (57) ABSTRACT

A driving support apparatus includes a display information obtainment section, a lighting state obtainment section, a validity determination section, and a support content setting section. The display information obtainment section obtains display information indicating a display content of at least one road sign present around a vehicle. The lighting state obtainment section obtains a lighting state of a corresponding traffic light, which corresponds to the road sign. The validity determination section determines whether or not a display content of a light limiting sign is effective based on the lighting state, when the light limiting sign is obtained based on the display information, the light limiting sign being a road sign whose display content is effective if the corresponding traffic light is in a predetermined lighting state. The support content setting section that sets a content of driving support based on a determination result of the validity determination section.

7 Claims, 8 Drawing Sheets

ALLOWED TO TURN RIGHT AFTER TEMPORARY STOP

FIG.4B

PROHIBITED FROM TURNING RIGHT WHEN SIGNAL IS RED

DRIVING SUPPORT APPARATUS

CROSS-REFERENCE TO RELATED APPLICATION

This application is based on and claims the benefit of priority from earlier Japanese Patent Application No. 2015-200244 filed Oct. 8, 2015, the description of which is incorporated herein by reference.

BACKGROUND

Technical Field

The present invention relates to a technique for supporting driving operation of a vehicle.

Related Art

Conventionally, a technique for recognizing a road sign has been known. In Japanese Patent No. 4604088, a technique for performing driving support is disclosed, in which a road sign is recognized, and the result of the recognition is displayed.

In some road signs, the represented content thereof is effective in a predetermined lighting state of a traffic light. In response to such a road sign, driving support is desired to be performed depending on whether the road sign is effective or ineffective.

SUMMARY

An embodiment provides a driving support apparatus that can perform driving support depending on validity or invalidity of a road sign.

As an aspect of the embodiment, a driving support apparatus is provided which includes a display information obtainment section that obtains display information indicating a display content of at least one road sign present around a vehicle; a lighting state obtainment section that obtains a lighting state of a corresponding traffic light, which corresponds to the road sign; a validity determination section that determines whether or not a display content of a light limiting sign is effective based on the lighting state, when the light limiting sign is obtained based on the display information, the light limiting sign being a road sign whose display content is effective if the corresponding traffic light is in a predetermined lighting state; and a support content setting section that sets a content of driving support based on a determination result of the validity determination section.

DETAILED DESCRIPTION OF THE PREFERRED EMBODIMENTS

Hereinafter, embodiments to which the present invention is applied are described with reference to drawings.

1. First Embodiment

[Configuration]

Figure 1:
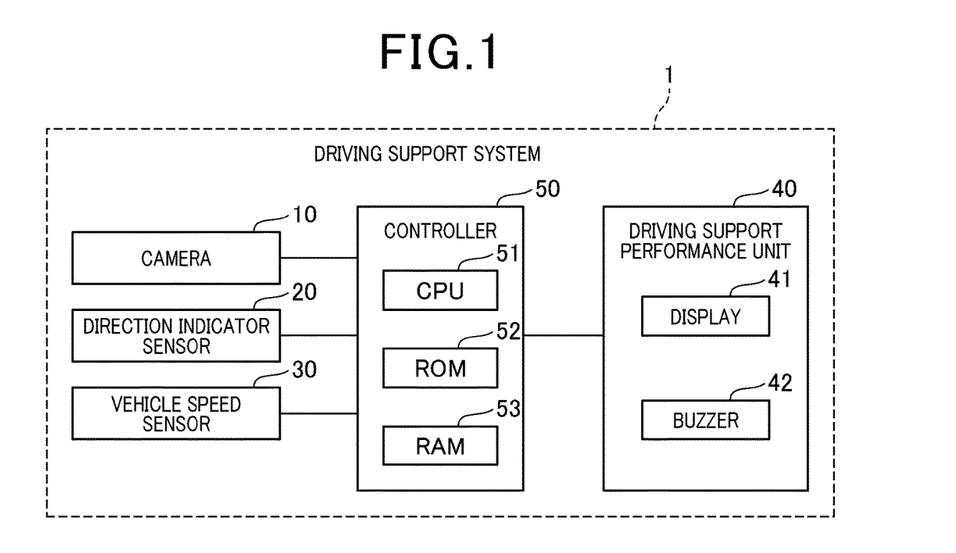
FIG. 1 is a block diagram showing a configuration of a driving support system.

A driving support system 1 shown in FIG. 1 is mounted in a vehicle, and includes a camera 10, a direction indicator sensor 20, a vehicle speed sensor 30, a driving support performance unit 40, and a controller 50. Hereinafter, the vehicle in which the driving support system 1 is mounted is referred to as an own vehicle.

The camera 10 is disposed so that the optical axis thereof is directed ahead of and in the traveling direction of the own vehicle. Thus, the camera 10 obtains image data representing an image of an object present ahead of and in the traveling direction of the own vehicle, and outputs the image data.

The direction indicator sensor 20 detects an operating state of direction indicators.

The vehicle speed sensor 30 detects a speed of the own vehicle.

The driving support performance unit 40 includes various devices for performing predetermined driving support in accordance with instructions from the controller 50. The driving support is support for driving operation of the driver who drives the vehicle. The driving support may alert the driver by, for example, an alarm output or image display. In addition, the driving support may include automatic driving of the vehicle performed instead of driving operation of the driver based on the state of the vehicle and the circumstances.

In the present embodiment, the driving support performance unit 40 includes a display 41 displaying images and characters and a buzzer 42 acoustically alerting the driver.

The controller 50 includes a known microcomputer having a CPU 51, a ROM 52, a RAM 53, and the like. The controller 50 performs a process achieving various functions for supporting driving of the vehicle according to a program stored in the ROM 52.

The controller 50 performs known image processing of image data obtained from the camera 10 to detect an object, for example, a white line indicating the boundary of a lane and painted on a road, a road sign, and a traffic light, in the image represented by the image data.

In addition, the controller 50 performs an intersection determination process, a sign recognition process, a lighting state determination process, a driving support process described later, and the like based on the detected object.

In the intersection determination process, when the controller 50 detects that a white line is broken ahead of and in the traveling direction of the own vehicle, the controller 50 determines that an intersection is present ahead of and in the traveling direction of the own vehicle. If the controller 50 determines that an intersection is present, the controller 50 stores the intersection information in the RAM 53. The intersection information indicates that an intersection is present ahead of and in the traveling direction of the own vehicle.

In the sign recognition process, when detecting a road sign, the controller 50 performs image processing such as known pattern matching to recognize display contents of one or more road signs located (present) around the vehicle. The display contents are indications of the road signs such as temporary stop and right turn prohibition. The controller 50 stores display information indicating the display contents in the RAM 53. The controller 50 represents the display contents of the recognized road sign in such a manner, for example, in which when recognizing the display contents of the sign "NO TURN ON RED" described later, the controller 50 sets a flag indicating the fact that the sign "NO TURN ON RED" is recognized. Such flags set for one or more road signs correspond to an example of display information. The controller 50 stores the display information in the RAM 53.

In the lighting state determination process, the controller 50 determines a lighting state of a corresponding traffic light. The corresponding traffic light is a traffic light corresponding to a road sign, that is, a traffic light mounted together with a road sign. Specifically, when a road sign and a traffic light are in the image taken by the camera 10, the traffic light mounted closest to the road sign is determined as a corresponding traffic light of the road sign. The lighting state is, for example, the light color of a traffic light, the blinking state of the traffic light, or a display manner of the traffic light such as an arrowed line, a circle, and the like. Note that, in the present embodiment, the lighting state signifies the light color of a traffic light.

The controller 50 determines whether the light color of the corresponding traffic light is red, yellow, or green for each road sign whose display content is recognized in the sign recognition process. The controller 50 stores light color information indicating the light color of the determined corresponding traffic light in the RAM 53. The ROM 52 previously stores, in addition to a program for performing various processes, a support management table.

Figure 2:
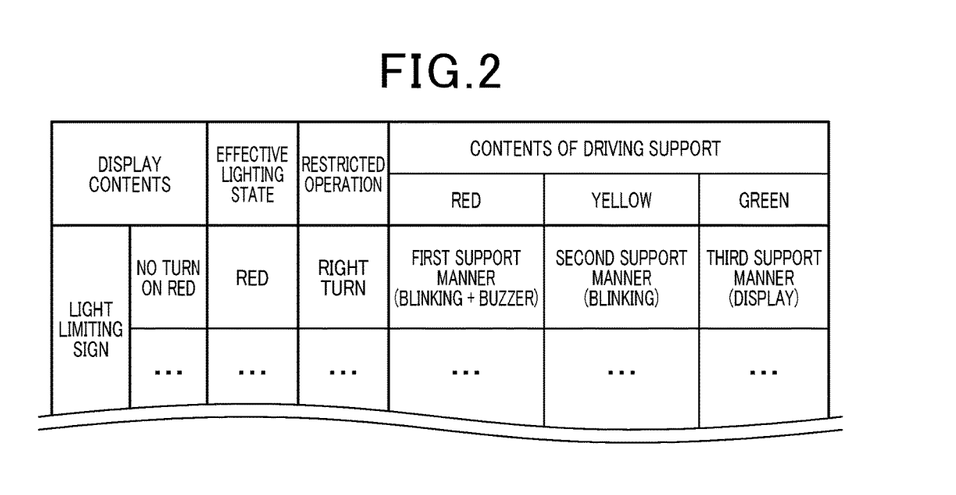
FIG. 2 is a diagram showing an example of a support management table.

In the support management table, as shown in FIG. 2, driving support contents to be performed by the controller 50 are set for the respective display contents regarding road signs that limit light (light limiting sign (signal limiting sign)).

The light limiting sign is a road sign whose display content becomes effective when the corresponding traffic light is in a predetermined lighting state. In the support management table, correspondence relationships between the display content of the light limiting sign, the lighting state of the corresponding traffic light whose display content becomes effective (effective lighting state), restricted operation, and the content of the driving support. Note that the restricted operation is operation of the vehicle restricted by the light limiting sign when the display content of the light limiting sign is effective. In addition, the operation of the vehicle is a movement of the own vehicle, for example, turning and stopping. The contents of the driving support are set for the respective lighting states of the corresponding traffic light, that is, the states of the light color.

Figure 3:
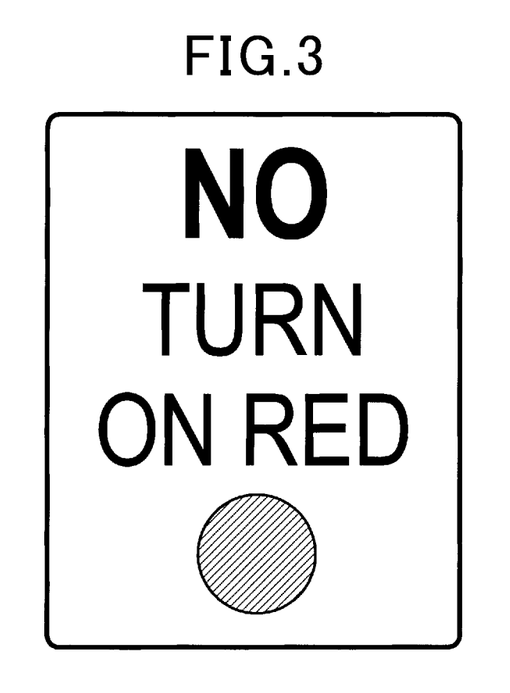
FIG. 3 is a diagram showing a sign of "NO TURN ON RED"

An example of the light limiting sign is, as shown in FIG. 3, a sign "NO TURN ON RED (right turn prohibition when the traffic light is red)" provided in the United States of America (hereinafter, referred to as the U.S.).

Figure 4A:
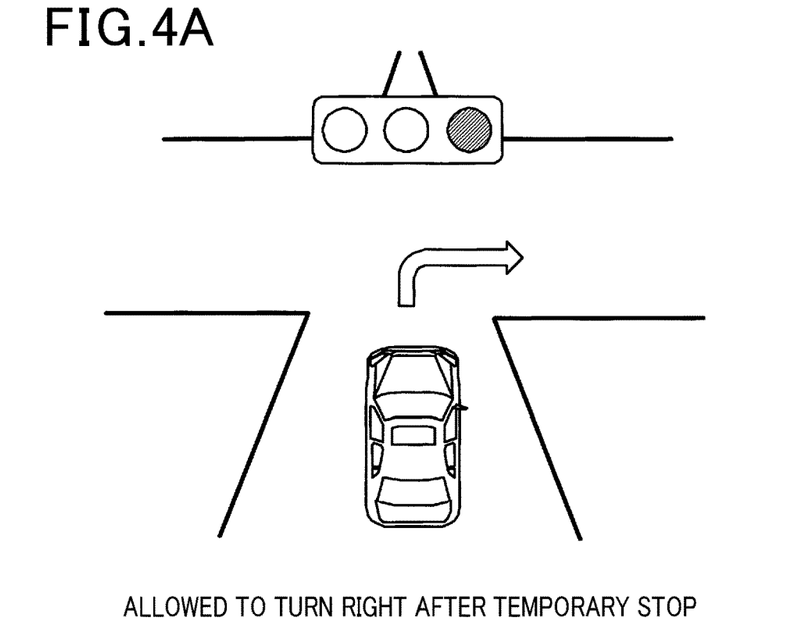
FIG. 4A is a diagram illustrating a traffic regulation for vehicles in a case where the sign "NO TURN ON RED" is not mounted.
Figure 4B:
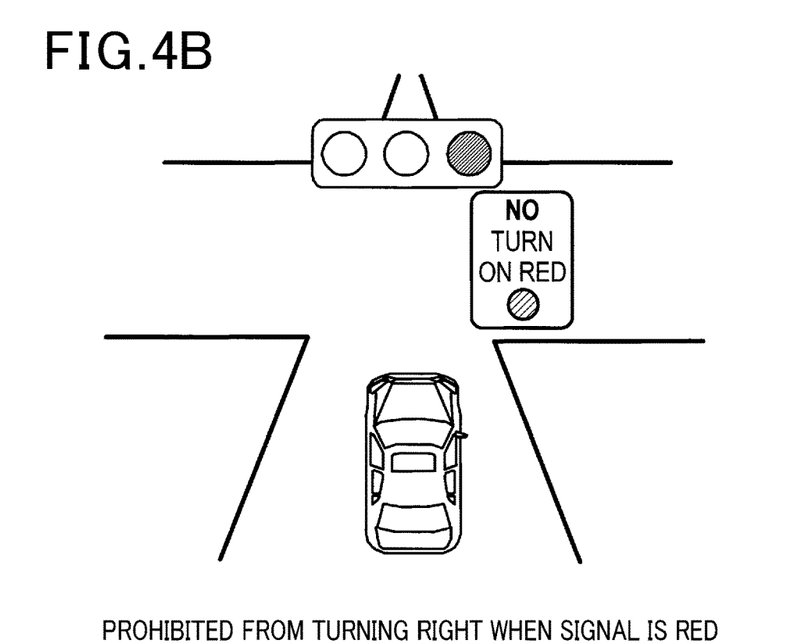
FIG. 4B is a diagram illustrating a traffic regulation for vehicles in a case where the sign "NO TURN ON RED" is mounted.

In the U.S., as shown in FIG. 4A, generally, when the light color of the traffic light is red (hereinafter, referred to as red light time), the vehicle is allowed to turn right at the intersection after a temporary stop. Note that, as an exception, there are intersections at which vehicles are prohibited from turning right at the red light time. The sign "NO TURN ON RED" is a sign mounted together with a traffic light at an intersection at which vehicles are prohibited from turning right at the red light time (refer to FIG. 4B). Note that the traffic light shown in FIG. 4B corresponds to the corresponding traffic light of the sign "NO TURN ON RED".

Returning to FIG. 2, in the support management table, when the lighting state of the corresponding traffic light is "red", the display content of the sign "NO TURN ON RED" is effective, and the restricted operation is right turn. When the light color of the corresponding traffic light is red, the content of the driving support is set to a first support manner. When the light color of the corresponding traffic light is yellow, the content of the driving support is set to a second support manner. When the light color of the corresponding traffic light is green, the content of the driving support is set to a third support manner.

Returning to FIG. 1, the RAM 53 stores intersection information, display information, light color information, and the like. In the RAM 53, each piece of the information is overwritten every time when each of the processes described above is performed, whereby the latest information is stored.

[Process]

Next, an example of the driving support process performed by the controller 50 (CPU 51) will be described with reference to the flowchart shown in FIG. 5. In the driving support process shown in FIG. 5, when a light limiting sign is recognized ahead of and in the traveling direction of the own vehicle, the driving support is performed depending on the lighting state of the corresponding traffic light. In the present embodiment, a process is described which is performed in a case where the sign "NO TURN ON RED" is recognized as a light limiting sign.

First, in S (step) 5, the CPU 51 of the controller 50 obtains intersection information from the RAM 53.

In S10, the CPU 51 determines whether or not an intersection is present ahead of and in the traveling direction of the own vehicle. Specifically, if the intersection information can be obtained in S5, that is, if the intersection information has been stored in the RAM 53, the CPU 51 determines that an intersection is present ahead of and in the traveling direction of the own vehicle. If the intersection information has not been stored in the RAM 53, the CPU 51 determines that no intersection is present ahead of and in the traveling direction of the own vehicle. When an intersection is present ahead of and in the traveling direction of the own vehicle, the CPU 51 shifts the present process to S15. When no intersection is present ahead of and in the traveling direction of the own vehicle, the CPU 51 shifts the present process to S75.

In S15, the CPU 51 obtains display information from the RAM 53.

In S20, the CPU 51 determines whether or not the sign "NO TURN ON RED" is obtained based on the display information obtained in S15. If the sign "NO TURN ON RED" is obtained, the CPU 51 shifts the present process to S25. If the sign "NO TURN ON RED" is not obtained, the CPU 51 shifts the present process to S75.

In S25, the CPU 51 obtains light color information from the RAM 53.

In S30, the CPU 51 determines whether or not the display content of the sign "NO TURN ON RED" is effective based on the light color information obtained in S25. In the case where the display content is effective, the display content of the road sign should be obeyed. In the present step, when the lighting state of the corresponding traffic light agrees with the effective lighting state in the support management table, the CPU 51 determines that the display content is effective.

Specifically, when the light color information indicates that the light color of the corresponding traffic light of the sign "NO TURN ON RED" is red, the CPU 51 determines that the display content of the sign "NO TURN ON RED" is effective. If the display content of the sign "NO TURN ON RED" is effective, the CPU 51 shifts the present process to S50. If the display content of the sign "NO TURN ON RED" is ineffective, the CPU 51 shifts the present process to S35.

In S35, the CPU 51 determines whether or not the color of the corresponding traffic light is yellow. Yellow is one of the light colors, yellow and green, of the corresponding traffic light by which the display content of the sign "NO TURN ON RED" becomes ineffective. If the color of the corresponding traffic light is not yellow, that is, if the color of the corresponding traffic light is green, the CPU 51 shifts the present process to S40. If the color of the corresponding traffic light is yellow, the CPU 51 shifts the present process to S45.

In S40 to which the present process proceeds if the light color of the corresponding traffic light is green, the CPU 51 sets the content of the driving support to the third support manner based on the support management table. In the third support manner, the CPU 51 sets an instruction to the driving support performance unit 40 (display 41) to display a message indicating the presence of the sign "NO TURN ON RED" on the display 41.

In S45 to which the present process proceeds if the light color of the corresponding traffic light is yellow, the CPU 51 sets the content of the driving support to the second support manner based on the support management table. In the second support manner, the CPU 51 sets an instruction to the driving support performance unit 40 (display 41) to display a message indicating the presence of the sign "NO TURN ON RED" on the display 41 while blinking the message.

In S50 to which the present process proceeds if the light color of the corresponding traffic light is red, the CPU 51 sets the content of the driving support to the first support manner based on the support management table. In the first support manner, the CPU 51 sets an instruction to the driving support performance unit 40 (display 41 and buzzer 42) to display a message indicating the presence of the sign "NO TURN ON RED" on the display 41 while blinking the message and to produce a buzzer sound.

In S55, the CPU 51 performs a vehicle state obtainment process for obtaining operation information indicating operation of the own vehicle.

In S60, the CPU 51 determines whether or not the operation of the own vehicle corresponds to the "right turn", which is restricted operation of the sign "NO TURN ON RED", based on the operation information obtained in the vehicle information obtainment process. Specifically, if the operation information is set to TRUE, the CPU 51 determines that the operation of the own vehicle corresponds to the restricted operation. If the operation of the own vehicle corresponds to the restricted operation, the CPU 51 shifts the present process to S65. If the operation of the own vehicle does not correspond to the restricted operation, the CPU 51 shifts the present process to S75.

In S65, the CPU 51 performs the set driving support. Specifically, the CPU 51 outputs the instruction set in any of S40, S45, and S50 to the driving support performance unit 40.

In the succeeding S70, the CPU 51 determines whether or not the light color of the corresponding traffic light invalidates the display content of the sign "NO TURN ON RED". Specifically, the CPU 51 determines whether or not the light color of the corresponding traffic light is green. If the light color of the corresponding traffic light is not green, the CPU 51 shifts the present process to S25, and repeats S25 and subsequent steps. If the light color of the corresponding traffic light is green, the CPU 51 completes the present driving support process.

In S75 to which the present process proceeds if the CPU 51 determines that no intersection is present ahead of and in the traveling direction of the own vehicle in S10, if the CPU 51 determines that the sign "NO TURN ON RED" has not been obtained in S20, or the CPU 51 determines that the operation of the own vehicle does not correspond to "right turn", which is restricted operation of the sign "NO TURN ON RED", in S60, the CPU 51 halts the driving support. Specifically, the CPU 51 prohibits the output of an instruction to the driving support performance unit 40. Then, the CPU 51 completes the present driving support process.

Figure 6:
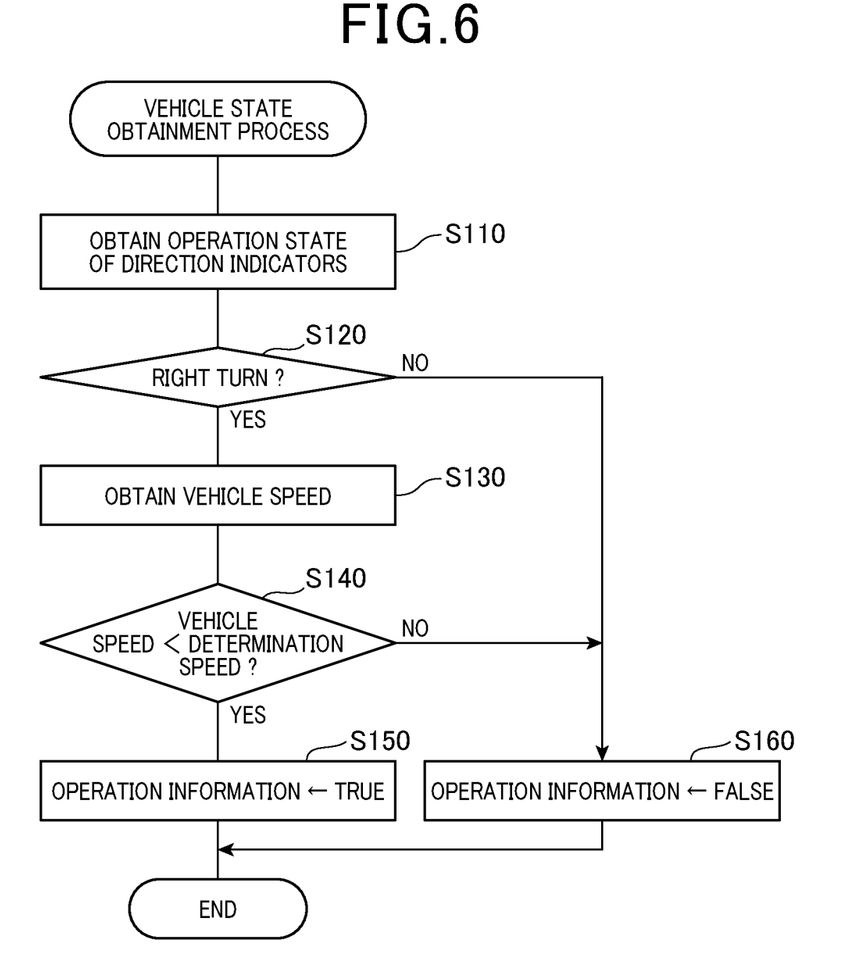
FIG. 6 is a flowchart of a vehicle state obtainment process according to the first embodiment.

Next, the vehicle state obtainment process performed in S55 of the driving support process will be described with reference to the flowchart shown in FIG. 6. In the vehicle state obtainment process, operation information is generated which indicates whether or not the operation of the own vehicle corresponds to "right turn", which is restricted operation of the sign "NO TURN ON RED".

In S110, the CPU 51 obtains an operation state of the direction indicators from the direction indicator sensor 20.

In S120, the CPU 51 determines whether or not the operation state of the direction indicators obtained in S110 indicates right turn. If the operation state of the direction indicators does not indicate right turn, the CPU 51 shifts the present process to S160. If the operation state of the direction indicators indicates right turn, the CPU 51 shifts the present process to S130.

In S130, the CPU 51 obtains the speed of the own vehicle from the vehicle speed sensor 30.

In S140, the CPU 51 determines whether or not the speed of the own vehicle obtained in S130 is less than a predetermined determination speed. The determination speed is set to a speed, for example, about 30 km/h, which is sufficiently lower than the speed of the vehicle traveling straight through an intersection, so that the vehicle turns right safely at the intersection. If the speed of the own vehicle is less than the determination speed, the CPU 51 shifts the present process to S150. If the speed of the own vehicle is not less than the determination speed, the CPU 51 shifts the present process to S160.

In S150 to which the present process proceeds when the operation state of the direction indicators indicates right turn and when the own vehicle has decelerated so as to safely turn right, the CPU 51 generates operation information which indicates that the operation of the own vehicle corresponds to "right turn", which is restricted operation of the sign "NO TURN ON RED". Specifically, the CPU 51 sets the operation information to TRUE, and then completes the present vehicle state obtainment process.

In S160 to which the present process proceeds when the operation state of the direction indicators does not indicate right turn and when the own vehicle has not decelerated so as to safely turn right, the CPU 51 generates operation information indicating that the operation of the own vehicle does not correspond to "right turn", which is restricted operation of the sign "NO TURN ON RED". Specifically, the CPU 51 sets the operation information to FALSE, and then completes the present vehicle state obtainment process.

Advantageous Effects

According to the first embodiment described above in detail, the following advantageous effects can be obtained.

[1A] When the sign "NO TURN ON RED" (hereinafter, referred to as light limiting sign) is obtained (S20: YES), the controller 50 determines whether or not the light limiting sign is effective based on the lighting state of the corresponding traffic light of the light limiting sign (S30). Then, the controller 50 sets the content of the driving support based on the result of the determination (S40, S45, S50). Thereby, the driving support can be performed depending on validity or invalidity of the light limiting sign.

[1B] At least when the light limiting sign is determined to be effective, the controller 50 sets the content of the driving support (S50). Thereby, when the light limiting sign is determined to be effective, necessary support can be performed.

[1C] When the light limiting sign is determined to be ineffective, the controller 50 may set the content of the driving support (S40, S45). Thereby, even when the light limiting sign is determined to be ineffective, necessary support can be performed.

[1D] When there are a plurality of lighting states of the corresponding traffic light in the case where the light limiting sign is determined to be effective or ineffective, the content of the driving support may be set for each of the lighting states of the corresponding traffic light. Thereby, more detailed driving support can be performed depending on the state of the traffic light.

[1E] The controller 50 may perform driving support based on the set content of the driving support (S65). Thereby, the driving support can be performed based on the content set depending on validity or invalidity of the light limiting sign.

[1F] When the operation of the own vehicle does not correspond to the restricted operation of the light limiting sign (S60: NO), the controller 50 may halt the driving support (S75). When the operation of the own vehicle does not correspond to the restricted operation of the light limiting sign, it can be considered that the driving support corresponding to validity or invalidity of the light limiting sign is not required. Thereby, the driving support corresponding to validity or invalidity of the light limiting sign can be performed only when the driving support is required.

[1G] When no intersection is present ahead of and in the traveling direction of the own vehicle (S10: NO), the controller 50 may halt the driving support (S75). When no intersection is present ahead of and in the traveling direction of the own vehicle, it can be considered that the probability of the presence of a traffic light ahead of and in the traveling direction of the own vehicle is low. In other words, it can be considered that the probability of the presence of a light limiting sign is low. That is, it can be considered that the driving support corresponding to validity or invalidity of the light limiting sign is not required. Thereby, the driving support corresponding to the light limiting sign can be performed only when the driving support is required.

Note that, in the first embodiment, the controller 50 corresponds to an example of the driving support apparatus.

Note that S5 corresponds to an example of the process of an intersection information obtainment section, S15 corresponds to an example of the process of a display information obtainment section, S25 corresponds to an example of the process of a lighting state obtainment section, and S30 corresponds to an example of the process of a validity determination section. In addition, S40, S45, and S50 correspond to examples of the process of a support content setting section. In addition, S55 corresponds to an example of the process of an operation obtainment section, S60 corresponds to an example of the process of a restriction correspondence determination section, S65 corresponds to an example of the process of a performance section, and S75 corresponds to an example of the processes of a non-correspondence time halt section and a non-intersection time halt section.

2. Second Embodiment

Differences From the First Embodiment

In the second embodiment, since basic configurations are similar to those of the first embodiment, the descriptions on the configurations common to those of the first embodiment are omitted, and the differences from the first embodiment are mainly described.

In the first embodiment described above, the controller 50 determines whether or not the operation of the own vehicle corresponds to the restricted operation, after setting the content of the driving support based on the display content of the road sign, that is, the fact that the road sign is the sign "NO TURN ON RED" and the light color information of the corresponding traffic light (S60). In contrast, the second embodiment differs from the first embodiment in that the controller 50 determines whether or not the operation of the own vehicle corresponds to the restricted operation, before setting the content of the driving support based on the light color information of the corresponding traffic light.

Figure 5:
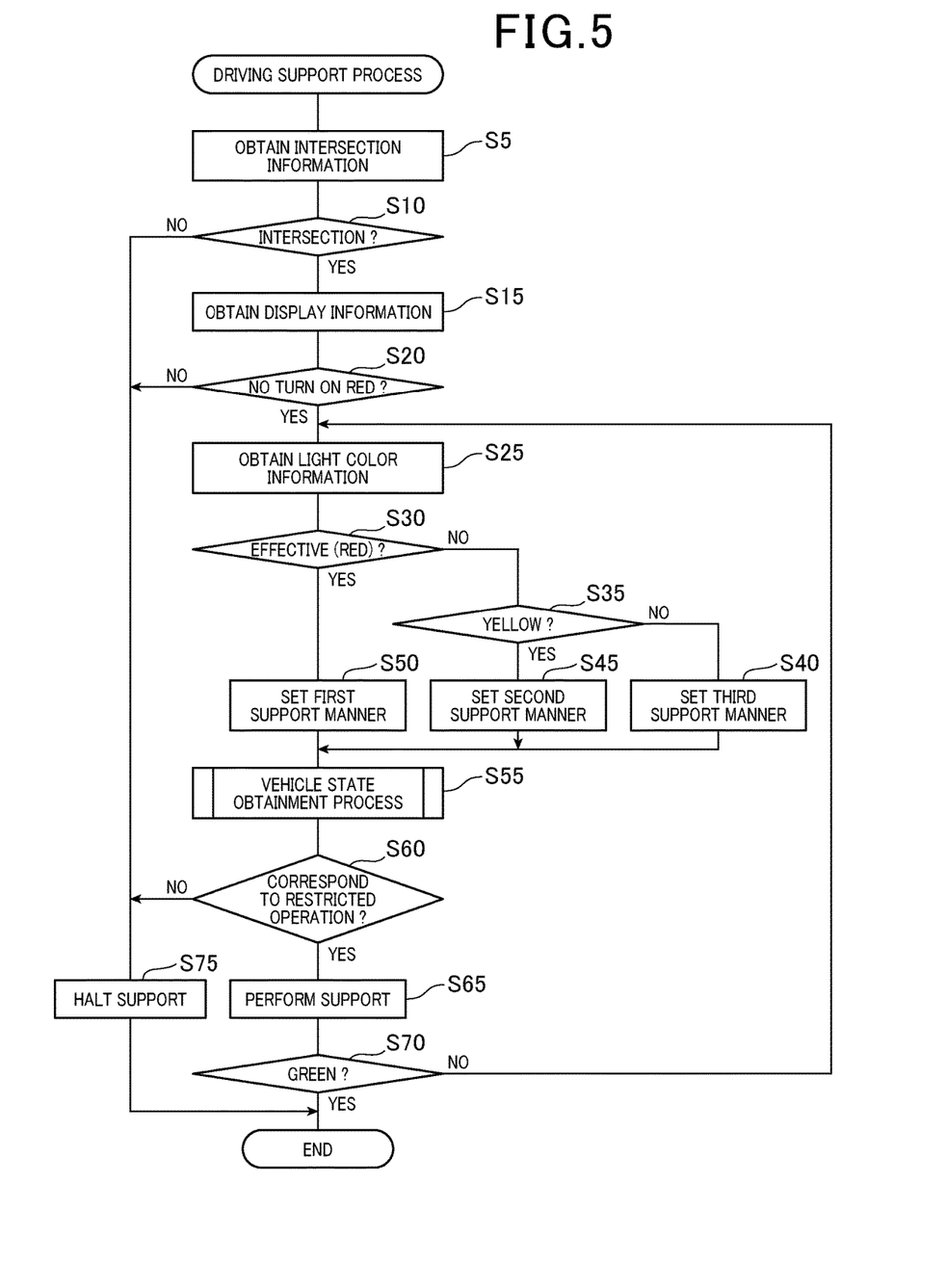
FIG. 5 is a flowchart of a driving support process according to a first embodiment.

Based on the differences, the driving support process (FIG. 7) performed by the controller 50 (CPU 51) in the present embodiment differs from the flowchart shown in FIG. 5 in that S22 and S24 are added and S55 and S60 are deleted.

[Process]

Figure 7:
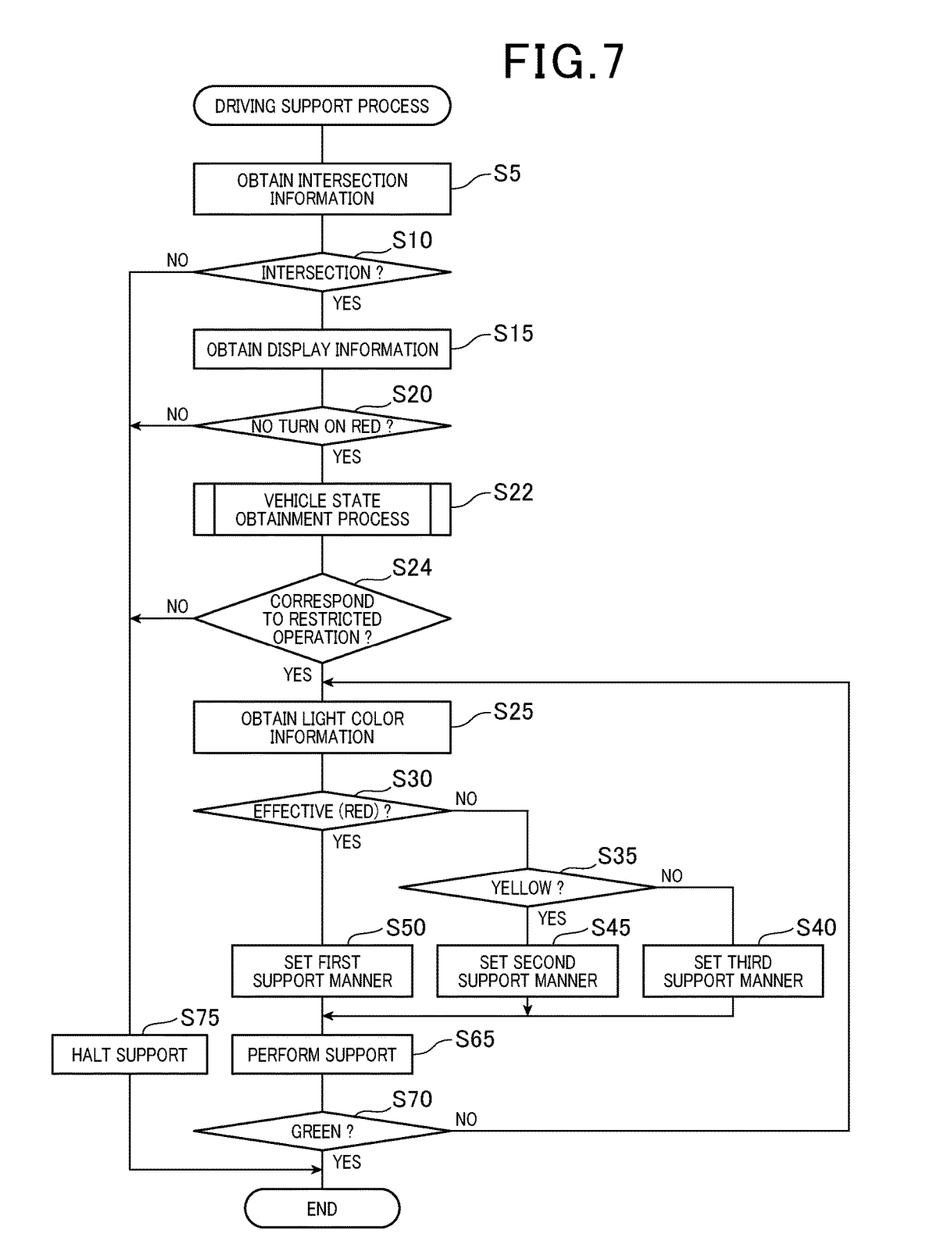
FIG. 7 is a flowchart of a driving support process according to a second embodiment.

The driving support process of the present embodiment will be described with reference to the flowchart shown in FIG. 7.

In S5 to S20, processes similar to those of the flowchart shown in FIG. 5 are performed.

In S22 to which the present process proceeds if it is determined that the sign "NO TURN ON RED" is obtained in S20, the CPU 51 performs the vehicle state obtainment process.

In the succeeding S24, the CPU 51 determines whether or not the operation of the own vehicle corresponds to the restricted operation of the sign "NO TURN ON RED". If the operation of the own vehicle corresponds to the restricted operation, the CPU 51 shifts the present process to S25. Thereafter, processes similar to those of the flowchart shown in FIG. 5 are performed (except for S55 and S60). In contrast, if the operation of the own vehicle does not correspond to the restricted operation, the CPU 51 shifts the present process to S75 in which the CPU 51 performs the processes similar to those of the flowchart shown in FIG. 5.

That is, in the present driving support process, after the sign "NO TURN ON RED" is obtained, when the operation of the own vehicle does not correspond to the restricted operation, the CPU 51 does not set and perform the content of the driving support.

Advantageous Effects

According to the second embodiment described above in detail, the following advantageous effects can be obtained in addition to the advantageous effects [1A] to [1E] and [1G] of the first embodiment described above.

[2A] If the sign "NO TURN ON RED" (hereinafter, referred to as light limiting sign) is obtained (S20: YES), and if the operation of the own vehicle does not correspond to the restricted operation (S24: NO), the CPU 51 does not set and perform the content of the driving support. Thereby, the content of the driving support corresponding to validity or invalidity of the light limiting sign can be set and performed only when the driving support is required. In addition, since unnecessary contents of the driving support are not set, the processing load of the controller 50 can be reduced.

Note that, in the second embodiment, S22 corresponds to an example of the process of the operation obtainment section, and S24 corresponds to an example of the process of the restriction correspondence determination section.

[Modifications]

When it is previously determined that the driving support process described above is performed in a state where only the sign "NO TURN ON RED" is defined as a light limiting sign, after the CPU 51 determines that an intersection is present ahead of and in the traveling direction of the own vehicle (S10: YES), the CPU 51 may determine whether or not the operation of the own vehicle corresponds to the restricted operation. If the operation of the own vehicle does not correspond to the restricted operation, setting and performing the content of the driving support may be halted. That is, the processes of S55 and S60 of the flowchart shown in FIG. 5 may be performed after S10. Thereby, since the CPU 51 obtains display information and determines whether or not the sign "NO TURN ON RED" is obtained only when required, the processing load of the controller 50 can be reduced.

3. Other Embodiments

It will be appreciated that the present invention is not limited to the configurations described above, but any and all modifications, variations or equivalents, which may occur to those who are skilled in the art, should be considered to fall within the scope of the present invention.

Figure 9:
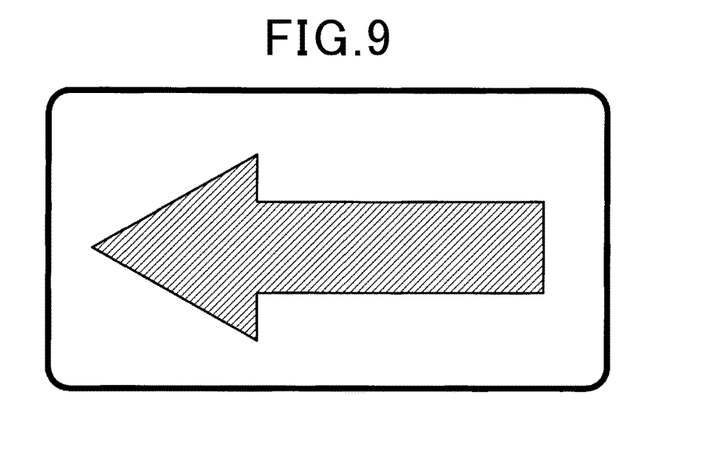
FIG. 9 is a drawing of a left turn sign (Japan)
Figure 10:
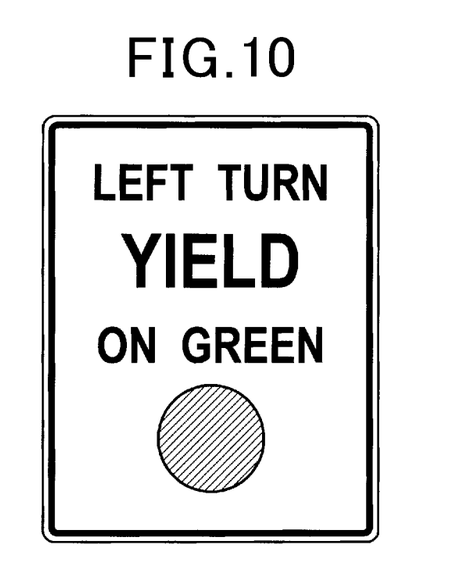
FIG. 10 is a drawing of a left turn yield on green sign (the U.S.).

[3A] The sign "NO TURN ON RED" in the above embodiments is an example of the light limiting sign. However the light limiting sign is not limited to this. The light limiting sign may be a sign whose validity or invalidity is set depending on not only the state of the light color of the traffic light but also various lighting states of the traffic light, for example, the blinking state of the traffic light and a display manner of the traffic light such as an arrowed line. Other examples of the light limiting sign include a left turn sign (Japan) shown in FIG. 9 and a left turn yield on green sign (the U.S.) shown in FIG. 10.

[3B] In the above embodiments, the content of the driving support is set for the case where the sign is effective and the case where the sign is effective. However, the setting may be performed when the sign is effective, and the setting may be prohibited when the sign is ineffective. That is, in the flowchart of FIG. 5, S35 to S45 may be deleted, and the CPU 51 may shift the present process to S75 if negative determination is made in S30. Thereby, the driving support is set and performed only when the sign is effective. That is, minimum required driving support can be performed to reduce the processing load of the controller 50.

Note that, depending on the driving support system 1, when the light limiting sign is effective, setting and performing the content of the driving support may be prohibited.

[3C] In the above embodiments, in the vehicle state obtainment process (FIG. 6), the controller 50 determines whether or not the operation of the own vehicle corresponds to "right turn", which is limited operation of the sign "NO TURN ON RED", based on the support management table. Specifically, when the operation state of the direction indicators indicates right turn, and if the vehicle speed is less than a determination speed, the controller 50 determines that the operation of the own vehicle corresponds to limited operation. However, the condition for the determination is not limited to this. For example, as shown in FIG. 8, S130 and S140 of FIG. 6 may be replaced with S135 and S145.

Figure 8:
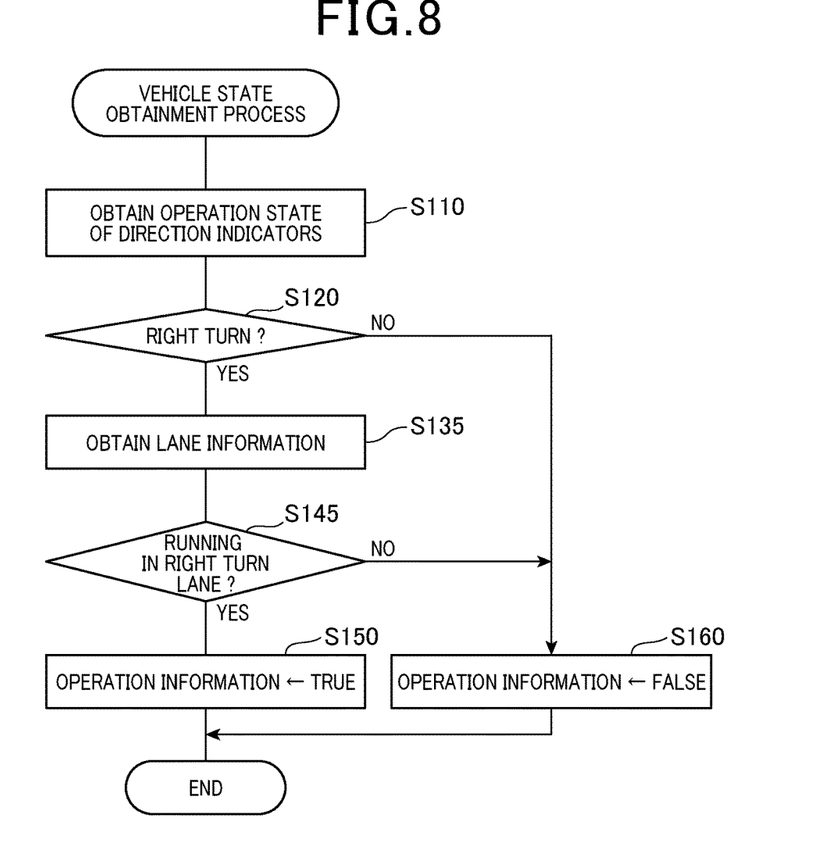
FIG. 8 is a flowchart of a vehicle state obtainment process according to another embodiment.

That is, as shown in FIG. 8, in S135, the controller 50 obtains lane information indicating that the lane in which the own vehicle is running is a right turn lane. Then, in S145, when the lane information is obtained, the controller 50 determines that the own vehicle is running in the right turn lane. Then, the CPU 51 shifts the process to S150. Thereby, whether the operation of the own vehicle corresponds to "right turn", which is limited operation, can be more accurately determined compared with the vehicle state obtainment process shown in FIG. 6.

Note that when the driving support is performed based on the light limiting sign other than the sign "NO TURN ON RED", the criterion for the determination in the vehicle state obtainment process may be set so as to determine whether or not the own vehicle corresponds to the limited operation of the light limiting sign.

[3D] In the above embodiments, for the sign "NO TURN ON RED", which is a light limiting sign, the controller 50 sets different contents of driving support, according to the support management table, for a plurality of light states (yellow and green) by which the display content is determined to be ineffective.

Note that the controller 50 may set the same content of the driving support, according to the support management table, for a plurality of light states (yellow and green) by which the display content is determined to be ineffective.

In addition, the controller 50 may set the content of the driving support, according to the support management table, for example, for the sign "NO TURN ON RED" only when the display content is determined to be effective. That is, in the flowchart shown in FIG. 5, the present process may proceed to S55 if negative determination is made in S30, and S35 to S45 may be deleted. Thereby, only the content of minimum required driving support can be set.

[3E] A function of one component in the above embodiments may be separated into a plurality of components. Alternatively, functions of a plurality of components may be integrated into one component. Part of the configurations of the embodiments may be omitted. In addition, at least part of the configuration of one embodiment may be added to the configuration of another embodiment, or may be replaced with the configuration of another embodiment.

[3F] The present invention can be achieved by, in addition to the controller 50 and the driving support system 1 described above, various aspects such as a program allowing the controller 50 to function, a medium storing the program, and a driving support method.

Hereinafter, aspects of the above-described embodiments will be summarized.

As an aspect of the embodiment, a driving support apparatus includes a display information obtainment section (S15), a lighting state obtainment section (S25), a validity determination section (S30), and a support content setting section (S40, S45, S50). The display information obtainment section obtains display information indicating a display content of at least one road sign present around a vehicle. The lighting state obtainment section obtains a lighting state of a corresponding traffic light, which corresponds to the road sign. The validity determination section determines whether or not a display content of a light limiting sign is effective based on the lighting state, when the light limiting sign is obtained (S20: YES) based on the display information, the light limiting sign being a road sign whose display content is effective if the corresponding traffic light is in a predetermined lighting state. The support content setting section (S40, S45, S50) that sets a content of driving support based on a determination result of the validity determination section.

According to the above configuration, since it is determined whether or not the road sign is effective by recognizing the display content of the road sign and the lighting state of the corresponding traffic light, the driving support can be provided depending on validity or invalidity of the road sign.

What is claimed is:

1. A driving support apparatus, comprising:
   a display information obtainment section that obtains display information indicating a display content of at least one road sign present around a vehicle;
   a lighting state obtainment section that obtains a lighting state of a corresponding traffic light, which corresponds to the road sign;
   a validity determination section that determines whether or not a display content of a light limiting sign is effective based on the lighting state, when the light limiting sign is obtained based on the display information, the light limiting sign being a road sign whose display content is effective if the corresponding traffic light is in a predetermined lighting state; and
   a support content setting section that sets a content of driving support based on a determination result of the validity determination section.

2. The driving support apparatus according to claim 1, wherein
   the support content setting section sets the content of the driving support if the validity determination section determines that the light limiting sign is effective.

3. The driving support apparatus according to claim 1, wherein
   the support content setting section sets the content of the driving support if the validity determination section determines that the light limiting sign is ineffective.

4. The driving support apparatus according to claim 1, wherein
   the support content setting section sets the content of the driving support for each lighting state of the corresponding traffic light.

5. The driving support apparatus according to claim 1, further comprising a performance unit that performs the driving support with the content set by the support content setting section.

6. The driving support apparatus according to claim 5, further comprising:
   an operation obtainment section that obtains operation information indicating operation of the vehicle;
   a restriction correspondence determination section that determines whether or not the operation of the vehicle corresponds to restricted operation, which is operation restricted by the light limiting sign, based on the operation information; and
   a non-correspondence time halt section that halts the driving support performed by the performance unit if the restriction correspondence determination section determines that the operation of the vehicle does not correspond to the restricted operation.

7. The driving support apparatus according to claim 5, further comprising:
   an intersection information obtainment section that obtains intersection information indicating presence of an intersection ahead of and in a traveling direction of the vehicle; and
   a non-intersection time halt section that halts the driving support performed by the performance unit if the intersection information is not obtained.

* * * * *